United States Patent

Grosvik et al.

[11] Patent Number: 5,256,844
[45] Date of Patent: Oct. 26, 1993

[54] ARRANGEMENT IN A PIPELINE TRANSPORTATION SYSTEM

[75] Inventors: Magne Grosvik, Stord; Kjell Ronningen, Fjellhamar, both of Norway

[73] Assignees: Aker Engineering A/S; Standard Telefon og Kabelfabrik A/S, both of Norway

[21] Appl. No.: 636,900

[22] Filed: Jan. 2, 1991

Related U.S. Application Data

[63] Continuation-in-part of Ser. No. 407,918, Sep. 15, 1989, abandoned, which is a continuation of Ser. No. 114,780, Oct. 30, 1987, abandoned.

Foreign Application Priority Data

Nov. 7, 1986 [NO] Norway .................. 864468

[51] Int. Cl.$^5$ .................................................. H05B 6/00
[52] U.S. Cl. .................. 219/10.51; 392/468; 392/478; 392/480; 392/482; 174/47; 138/103; 138/149; 165/184; 165/185
[58] Field of Search ............. 219/10.51, 522, 535, 219/548, 104.91; 392/468, 469, 472, 480, 478, 482, 483; 174/47, 11 R, 15.6; 138/103, 104, 149; 165/184, 185

[56] References Cited

U.S. PATENT DOCUMENTS

| | | | |
|---|---|---|---|
| 202,047 | 4/1878 | Phillips | 174/47 |
| 2,178,931 | 11/1939 | Crites et al. | 439/191 |
| 2,457,843 | 1/1949 | Strickland | 174/47 |
| 2,578,280 | 12/1951 | Barnard | 174/95 |
| 3,335,251 | 8/1967 | Rolfes | 219/10.51 |
| 3,423,570 | 1/1969 | Trabilcy | 392/468 |
| 3,522,413 | 8/1970 | Chrow | 392/468 |
| 3,526,086 | 9/1970 | Morgan | 138/111 |
| 3,548,158 | 12/1970 | McCaskill | 219/530 |
| 3,598,959 | 8/1971 | Ando | 392/469 |
| 3,603,719 | 9/1971 | Lejeune | 174/47 |
| 3,630,038 | 12/1971 | Ando | 405/154 |
| 3,665,154 | 5/1972 | Ando | 392/469 |
| 3,784,785 | 1/1974 | Noland | 392/468 |
| 3,818,116 | 6/1974 | Kuljian | 174/15.6 |
| 3,899,631 | 8/1975 | Clark | 174/47 |
| 3,971,416 | 7/1976 | Johnson | 138/33 |
| 3,975,617 | 8/1976 | Othmer | 392/469 |
| 4,002,881 | 1/1977 | West | 392/469 |
| 4,069,409 | 1/1978 | Noland et al. | 392/468 |
| 4,194,536 | 3/1980 | Stine et al. | 138/149 |
| 4,366,356 | 12/1982 | Ando | 219/10.51 |
| 4,429,213 | 1/1984 | Mathieu | 392/468 |
| 4,523,141 | 6/1985 | Thomas et al. | 324/557 |
| 4,525,813 | 6/1985 | Burrage | 367/20 |
| 4,554,650 | 11/1985 | Brown et al. | 367/154 |

FOREIGN PATENT DOCUMENTS

| | | | |
|---|---|---|---|
| 443312 | 2/1966 | Japan | 138/33 |
| 624048 | 9/1978 | U.S.S.R. | 174/47 |
| 1021862 | 3/1966 | United Kingdom . | |
| 1141014 | 1/1969 | United Kingdom . | |
| 1203355 | 8/1970 | United Kingdom . | |
| 1496066 | 12/1977 | United Kingdom . | |
| 1387180 | 3/1979 | United Kingdom . | |
| 1566691 | 5/1980 | United Kingdom . | |
| 2049867 | 12/1980 | United Kingdom . | |
| 2051294 | 1/1981 | United Kingdom . | |
| 2084284 | 4/1982 | United Kingdom . | |
| 2124728 | 2/1984 | United Kingdom . | |
| 2139312 | 11/1984 | United Kingdom . | |

Primary Examiner—Bruce A. Reynolds
Assistant Examiner—Tu Hoang
Attorney, Agent, or Firm—Watov & Kipnes

[57] ABSTRACT

The present invention relates to a transportation pipe or conduit (10, 20, 30) which preferably is adapted to be installed on the seabed between a permanent or floating off-shore platform (3) and an on-shore terminal (4). The transportation conduit comprises an inner tube or pipe (21, 31) which primarily is constructed for the transmission of gas and/or oil or similar, a plurality of elements (23, 33) provided preferably as a layer outside the pipe (21, 31) and being adapted for transmission of preferably electric power. The elements (23, 33) which preferably might be made of copper or another material of appropriate electric conductivity, is insulated against the outer environment, for example by means of an appropriate thermal insulation material (24, 34). The inner tube (21, 31) might be manufactured from steel or a flexible material of considerable strength, and be surrounded by a corrosion preventing layer (22, 32). Some of the elements to be used for electric power transmission might be provided with a sufficient electric insulation.

12 Claims, 3 Drawing Sheets

ARRANGEMENT IN A PIPELINE TRANSPORTATION SYSTEM

The present invention is a continuation-in-part of U.S. patent application Ser. No. 07/407,918 filed on Sep. 15, 1989 and abandoned on Mar. 11, 1991 which is a continuation of U.S. patent application Ser. No. 07/114,780 filed on Oct. 30, 1987 and abandoned on Oct. 23, 1989.

FIELD OF THE INVENTION

The present invention relates to an arrangement in a pipeline transportation system for transmitting a fluid selected from gas, oil or a mixture of gas and oil and electric energy between spaced apart locations.

BACKGROUND OF THE INVENTION

The invention is especially contemplated for use in connection with transportation pipes or conduits adapted for installation on the seabed between a stationary or floating offshore platform and an on-shore terminal. However, it is to be understood that the principle of the invention can also be utilized in connection with transportation between seabed installations as well as from the seabed to a platform, and possibly in connection with on-shore systems.

More specifically, the present invention has been developed in connection with offshore production plants for the production of gas and/or oil in which a portion of the gas might be transported ashore via transportation pipes, whilst simultaneously electric power which is generated by another portion of the gas, is transmitted in separate electric cables which preferably run in parallel to the seabed transportation pipeline.

This solution may also serve as a safe back-up system in case of emergency or a shutdown situation offshore. In that case, electrical energy will be transported from an on-shore power station to an offshore platform consumer.

Further, such transmission of electric energy from an on-shore power station which is based on hydro power is also favorable as regards anti-pollution, especially compared with an offshore gas turbine power station based on gas combustion and discharge of $CO_2$.

In such offshore production plants the availability of hydrocarbon products from the offshore process plants is strongly dependent on the flow efficiency in the export pipeline system. If the temperature in such an export pipeline system is falling below a certain temperature (in the range of 15°C.), crystallization and the development of hydrates would occur, which would bring forth a congestion of the oil/gas mixture which is to be transported through the pipeline system In order to ensure an efficient flow through the pipelines, the operator must thus have full control of the hydrate and wax deposits, such deposits being avoided or removed by either chemical injection or by heating the pipeline to an appropriate temperature.

PRIOR ART

U.S. Pat. No. 3,528,086 to Morgan (corresponding to GB 1.210.206) refers to a multiconduit underwater line comprising a main pipe as well as hoses and other conduits which are twisted in spiral configuration around the main pipe. The other conduits may provide conduction of electric power and/or communication signals where the circumstances so require, and the prior art mentions an underwater life support facility as an example. Consequently, this prior art teaching does not give any instructions for letting the heat from any electric cable be transferred through the main pipe for the heating of the contents therein, the prior art main pipe being used substantially as a riser.

GB 1.387.180 to Felten relates to a hollow cable comprising a pipe-shaped supporting device and being adapted to transmit electric energy as well as being able to convey fluids and to absorb high-tensile loads.

However, the hollow cable according to the prior art comprises an elastic pipe of plastic material, for example polyamide including a reinforcement of a steel spiral which is a material which cannot be utilized as a combined oil/gas transportation conduit which is to be heated by means of high voltage electric power, let alone by induction heating therefrom, due to a poor heating conductivity and its non-magnetic properties. The heating effect is here limited to ohmic resistant heating only, i.e. $P = I^2 \cdot R$ losses.

GB 1.021.862 to Greenlees relates to an insulated multicore flexible cable making multiple electrical connection to movable components in nuclear reactors, but gives no instructions for how to combine electrical power transmission and heated transmission of gas and oil in a pipe or conduit.

U.S. Pat. No. 3,522,413 to Chrow relates to a heat conductive fluid sampling line which is maintained at a desired temperature by at least two electrical heating wires. The inner tube, i.e. the control line suggested by Chrow is a thin-walled pipe having a wall thickness of 0.035 inches or approximately 0.9 mm, made of stainless steel. The heating wires are made of nickel-chromium and are insulated with a polymeric tape covered by a single fiber glass braid.

However, the composite pipe defined by Chrow can not be applied as a subsea combined transportation conduit for oil/gas and high voltage alternating current, first of all since the prior art pipe has an insignificant strength and can only be used in process plants where no high pressure conditions prevail. Besides, the electric heating wires according to Chrow are only defined as heating cables, i.e. the electric power being transmitted therethrough will only give a heating effect through the ohmic resistance, which indicate that only direct current power has been contemplated in connection with the heating wires. Inductive heating in the prior art pipeline cannot be used since the inner pipe should be made of stainless steel, which can also be defined as "austenitic alloy steel", which is a non-magnetic steel without the possibility of inducing inductive resistance in connection with an alternating current circuit.

U.S. Pat. No. 4,523,141 to Thomas et al. relates to a pipe coating, comprising a steel pipe which is provided with a conventional primer and anti-corrosion coating, over which is provided a foamed polyurethane plastic layer, as well as an intermediate layer and an outer barrier layer. This prior art pipe coating and the pipe in question could not be used for a subsea combined transportation conduit for gas/oil or a mixture of gas and oil, and there is no hint in this prior art publication about the use of high voltage alternating current for induction heating the wall of the transportation pipe for thereby conducting induced heat from the walls of the pipe to the gas and oil mixture being transported therethrough.

U.S. Pat. No. 3,818,116 to Kuljian relates to a combination transmission line and fluid conduit system including an inner conduit containing electrical transmission line conductors surrounded by an insulating and heat absorbing medium, such as transformer oil, $SF_6$ or compressed air. This insulating and heat absorbing medium is enclosed in an inner pipe made of aluminum.

The heat absorption medium absorbs the heat losses produced by the flow of current through the conductors, each of which is housed in a respective inner pipe which in turn are provided with spacers radially extending to an outer pipe made of aluminum. In the annular space defined between the inner conduit 14 and the outer conduit there are pumped fluid under pressure, for example crude oil. The heating of the crude oil will according to Kuljian be based on the transmission losses calculated from the formula $I^2 \times R$, where I is the current in the line and R is the electric wire resistance. Since the inner pipe and the outer pipe are manufactured from the same material, more specifically from aluminum in order to prevent electromagnetic induction, no alternating current heating has been suggested by Kuljian. Also the spaces are made of non-electrically conducting material, which further emphasizes that only direct current or direct voltage is contemplated according to this prior art.

Further, the Kuljian system would most presumably only find application as a landbased transportation system, since the pipe material made of aluminum, which for the transportation of a subsea well stream, such as oil/condensate/gas having a specific contents of $H_2S$ would be detrimental to the lifetime of such an aluminum pipe. Aluminum is very difficult to use in subsea environments in any cases, and is especially prone to be attacked by $H_2S$, as this is generally known within the field of material technology.

U.S. Pat. No. 3,975,617 to Othmer relates to electric heating of pipelines transporting liquid with high viscosity, for example crude oils or similar.

The inner pipe may be a thin-walled steel pipe for transporting liquid, and on the outside of this pipeline there is arranged an insulated current wire which is connected at the near end to one terminal of an alternating current source, and on the far end to the external surface of the pipe. In other words, the electric wire is here physically connected to the steel pipe. Consequently, the current wire and the steel pipe are both included as conductors in a current circuit, and when alternating current is conducted through the current wire and the steel pipe, there is induced power loss in the steel pipe due to so-called skin effect coursed by induced magnetic flux.

Since the prior art steel pipe is used as a return path, this will put very heavy restrictions on the contemplated field of application. The prior art steel pipe could not be utilized as a subsea combined transportation conduit for oil/gas and high voltage electric power, especially across distances of 20-70 km, or 12.5-43 miles.

U.S. Pat. No. 3,423,570 to Trabilcy relates to heating of a fluid-receiving conduit structure by means of radiant heat, for example a pipeline including radiant heating elements closely facing the exterior of the fluid-receiving structure. In other words, this prior art teaching is related to the transfer of heat by radiation over a large surface, and requires a plurality of interconnected heating elements, which are embedded in an insulating material. This special requirement for heating elements results in a very complicated insulation and covering around said elements, which in turn would not be appropriate for a subsea combined transportation system.

OBJECTS OF THE INVENTION

A main object of the invention is to give instructions for an improved pipeline transportation system which provides a simple installation, and which can also be manufactured at a lower cost than separate pipes and electric power cables.

A second object of the present invention is to provide an improved pipeline transportation system in which fluid can be transmitted through a pipeline between two spaced apart locations, and in which high voltage electric energy can be transmitted simultaneously by means of fully insulated power cables from one of the locations to a load in the opposite far end location.

Another object of the invention is to make use of the energy losses from the high voltage electric power cables to heat the pipeline in the transportation system for thereby indirectly heating the contents therein.

A further object of the present invention is to provide a combined transportation conduit based on a single-chamber pipe made of steel, such pipelines being of ferritic material, i.e. for example carbon steel.

A still further object of the present invention is to provide such a carbon steel pipeline with at least one outer layer of corrosion protecting material, and along this corrosion protected carbon steel pipeline to provide two or more high voltage alternating current cables being designed for voltage transmission at 12000 Volts and above.

A further object of the present invention is to provide a pipeline transportation system in which there is no galvanic connection between the high voltage cables and the pipeline in question, and wherein the heating of the pipeline is effected by the energy losses from the alternating current in the high voltage conductors. In other words, the heating of the pipeline will on the one hand be due to the ohmic resistance in the copper conductors and on the other hand be due to induced electro-magnetic force. i.e. electro-magnetic induction created by magnetic flux from the high voltage alternating current conductors.

Still another object of the present invention is to provide a pipeline transportation system in which the electrical conductors effect a combined transmission of high voltage electric power between spaced apart locations and at the same time is used for heating a parallelly running pipeline holding gas, oil or a mixture of gas and oil.

Yet another object of the present invention is to provide means operatively connected to said spaced apart location for regulating or measuring the amount of electrical energy passing through said conductors, and the amount of heat passing to the fluid in the pipeline, in order to control the temperature of the transported mixture of gas and oil.

Further objects and features of the present invention will appear from the following detailed description taken in conjunction with the attached drawings.

BRIEF DISCLOSURE OF THE DRAWINGS

DETAILED DISCLOSURE OF EMBODIMENTS

Figure 1:
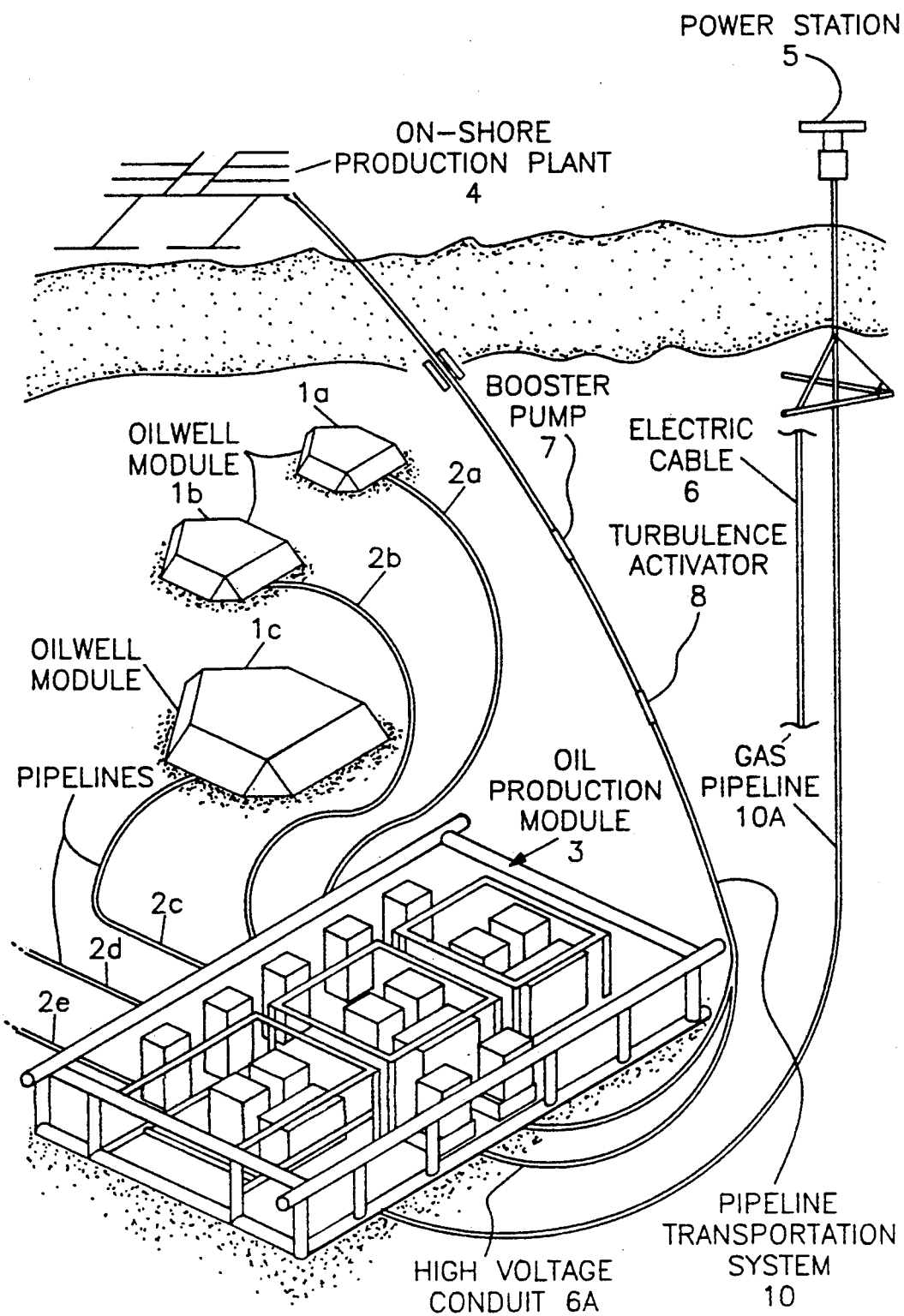
FIG. 1 is a perspective view of a typical seabed installation for deep sea oil fields, in which the present invention finds application.

In FIG. 1 which is a perspective view of a typical seabed installation for deep sea oil fields, there are illustrated a plurality of oil well modules 1a, 1b, 1c which through individual pipelines 2a, 2b, 2c, respectively are connected to a production module 3. Further pipelines 2d and 2e indicate that further oil modules may be involved.

The production module 3 receiving crude oil from the various oil well modules processes the crude oil so as to prepare for the transportation thereof from this seabed production module 3 to an on-shore production plant 4. Consequently, there is provided a pipeline transportation system 10 running from the production module 3 and to said production plant 4, and in this transportation system 10 there is included a special transportation conduit which will be further described in connection with the FIGS. 3-5.

The transportation system 10 will mainly transport crude oil and/or gas, whereas some of the gas will be conducted through another pipeline 10A to a power station 5 located somewhere apart from the production module 3, and being driven by a gas turbine supplied with gas through the gas pipeline 10A.

The electric power generated in the power station 5 is transmitted back to the production module 3 through an electric cable 6, and through a not illustrated power distribution station on the production module 3. This electric power will through high voltage conduits 6A and at an appropriate voltage level, for example above 12 kV, be merged with the pipeline transportation system 10 which also includes one or more booster pumps 7, and one or more turbulence activators 8. In order to transmit fluid through the main pipeline of the transportation system 10 between the two spaced apart locations, i.e. the offshore subsea production module 3 and the on-shore production plant 4 at an appropriate temperature for thereby avoiding a congestion due to hydrate and wax deposits from the crude oil, the transmission of the high voltage power through the conductors 6A are combined in a new and effective manner so as to transmit fluid and high voltage electricity in parallel in the same combined pipeline transportation system, wherein the high voltage electric conductors are used not only for transmitting high voltage electric energy between said two spaced apart locations, but also for using losses from the electric power cables for heating the fluid in the combined pipeline transportation system.

This combined transportation system will be further disclosed in the following.

Figure 2:
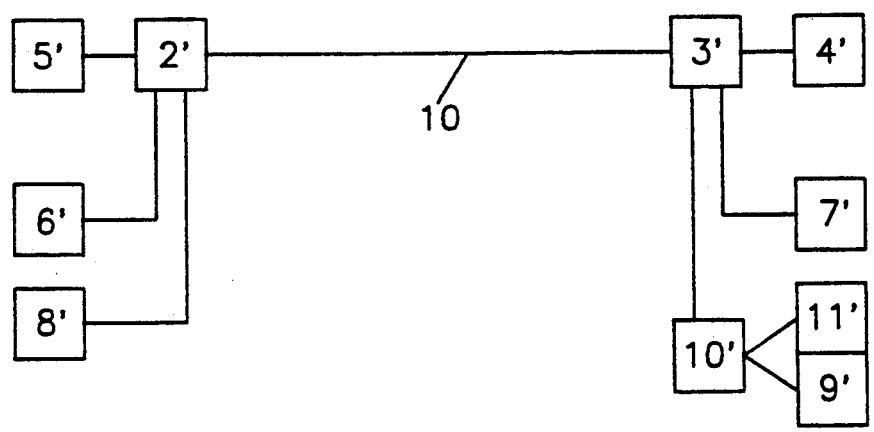
FIG. 2 is a simplified block diagram illustrating how the pipeline transportation system according to the invention can be installed.

In FIG. 2 which is a simplified block diagram illustrating how the pipeline transportation system according to the present invention can be installed, reference numeral 10 designates the pipeline transportation system or multiconduit, which is installed between two distribution terminals 2' and 3' which may correspond to the production module 3 and the production plant 4, respectively, as discussed in connection with FIG. 1, or may represent two other distribution terminals. Gas and/or oil is transported for example from a first position 5' to a second position 4', whereas other conductive elements included in the transportation conduit may transfer for example electric signals from one more further positions 6' at the first end of the conduit to one or more further positions 7' at the second end thereof. Some of the elements or certain elements of the transportation conduit 10 are adapted for the transfer of high voltage electric power from a current source 8' at the first end of the transportation conduit 10 to a consumer location 9' at the other end thereof. The transmission of the electric power between the distribution terminals 3' and the consumer location 9' may pass through a current measuring device 10'. If the electric current should sink below a predetermined level because the consumption of current at the consumer location 9' is below normal, the device 10' is so arranged that it will switch in an extra current load 11', such that the current throughput via the power conducting elements of the transportation conduit is kept between predetermined levels. Thereby is achieved that this level matches an appropriate predetermined temperature level of the transportation conduit and the contents thereof.

It is to be understood that the direction of electric current transmission and the direction of the flow of gas and/or oil can be the same or can be the opposite. Thus, for example in case of a shutdown situation offshore, electric power could be transported from the on-shore power station to an offshore platform consumer, so as to still keep the predetermined temperature level of the transportation conduit with its contents.

Figure 3:
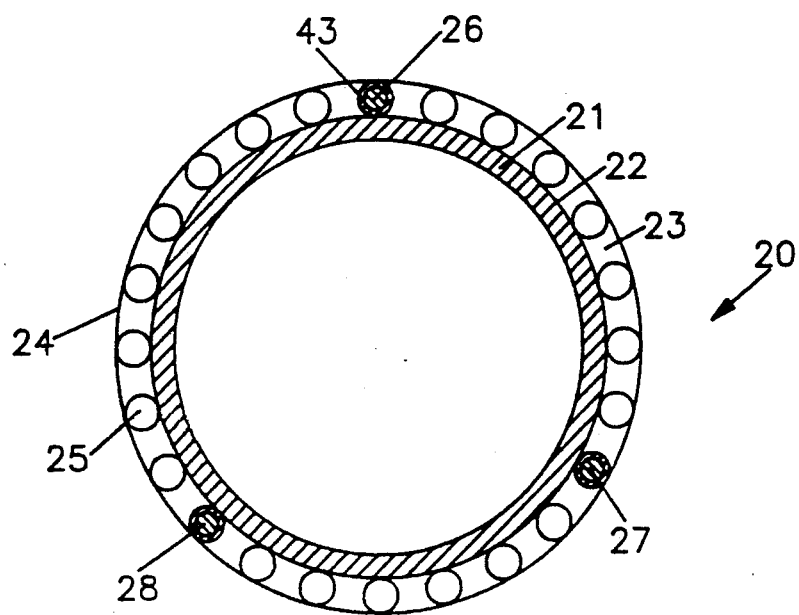
FIG. 3 and 4 illustrate a first and a second embodiment of a combined transportation conduit according to the present invention, respectively.
Figure 4:
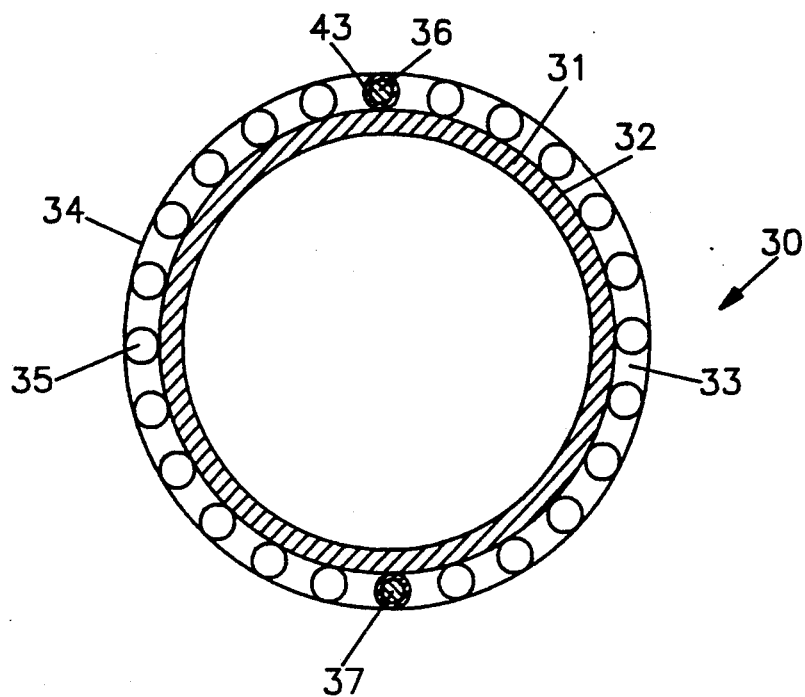

In FIG. 3 and 4 there are illustrated simplified sections through embodiments of two combined transportation conduits 20 and 30, respectively, said embodiments according to the present invention being adapted for combined transportation of oil/gas and the transmission of high voltage electric power, preferably alternating high voltage power.

Each of the transportation conduits 20 and 30 comprise an inner carbon steel tube or pipe 21, 31 serving for the transportation of gas and/or oil or similar. Each of the pipes are manufactured as a single-chamber pipe made of steel, the terminology steel here including ferritic material, i.e. more precisely carbon steel. This carbon steel pipeline is provided with at least one outer layer of corrosion protecting material 22 and 32, respectively, and along this corrosion protected carbon steel pipeline 21, 31, there are provided two or more high voltage alternating current cables 26-28 and 36-37, respectively, designed for current transmission at a voltage level of 12000 Volts and above. Said high voltage cables may be included in a layer of elements 23 and 33, respectively, and may be manufactured from copper or some other material having excellent electrical conductive properties, and being provided with a sufficient electric insulation therearound for being operated at 12000 kV or above. The elements of the layers 23 and 33, respectively, can thus be used for the transmission of high voltage alternating current, depending on the conditions prevailing on the production location and the transmission requirements at the consumer location, and also in dependence of what temperature the contents of the inner pipe 21, 31 should hold.

Figure 5:
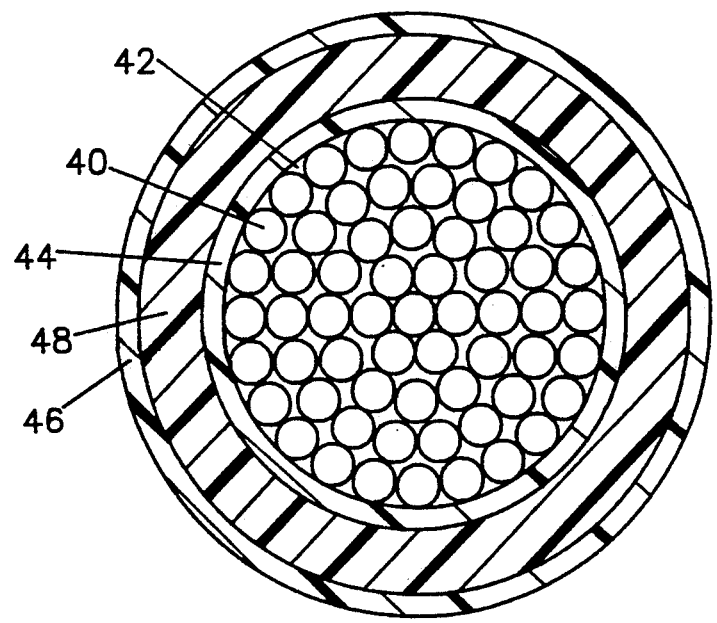
FIG. 5 is an exploded detailed view in cross-section of the current cable employed in the embodiments of FIGS. 3 and 4.

The high voltage cable is shown in FIG. 5 and includes a plurality of conductors 40 which may be separated from each other by a customary semiconductor filling compound 42. The bundle of conductors 40 is surrounded by an insulating material 43 such as crosslinked polyethylene which may be in the form of a layer 48 sandwiched between respective screens 44 and 46.

The conduit 20 of FIG. 3 may be adapted for 3-phase alternating current, for example at a voltage level of 12-24 kV, whereas the conduit 30 of FIG. 4 may be adapted for the transmission of single phase alternating high voltage current.

Appropriately, there might be used three elements 26, 27, 28 on each pipe 20 for the transmission of 3-phase alternating current. The elements should then preferably be evenly distributed around the circumference of the pipe, involving a mutual distance corresponding to 120°. A multiple of three elements might also be used, but then installed in such a manner that the current is distributed preferably evenly in the parallel phases.

When a transmission of single phase alternating current is contemplated, two conductors 36, 37 representing the two conductors involved therein, or a multiple of two conductors could be distributed in the layer 33, as depicted in FIG. 4. An important aspect of the electric conductors arranged as described, is to utilize the induction power produced by the high voltage conductors. Hereby the viscosity, and consequently the flow within the conduit will be kept at a desired consistency. This induction heating together with a possible ohmic heating from the high voltage electrical cables which are not in galvanic connection with the steel of the conduit itself, will be an important key to the solution of the "two-phase flow problem", and also represents an important alternative solution to methanol or glycol injection. Taking into consideration, the concern about the conservation of the environment and the avoidance of pollution, this method of electrical heating of the transport pipeline is the most favorable, because injection of methanol or glycol into the transported oil and as phase is not required here.

In the on-shore process plants, the injected methanol or the injected glycol have to be regenerated from the oil and gas phase. This is a rather expensive process. The fact is that 50% of the injected methanol and 10% of the injected glycol have to be regarded as unrecoverable and as such to be calculated as lost in the gas- and oil products. These poisonous injected chemicals will later cause a danger by contribution to environmental pollution.

It is to be understood that some of the elements 25 or 35 in the respective layers 23, 33 can also serve for the transmission of other forms of energy than electric energy, for example transmission of hydraulic medium, possibly in a combination with a transmission of electric signals and power. The elements 25, 35 can also be constituted by cables for the transmission of telecommunication signals.

Outside the layer of elements 23, 33, respectively, there is provided an outer insulation layer 24 and 34, respectively, each of which serving to insulate the elements in said layer thermally against the ambient surroundings. The transportation conduit might if necessary be provided with an outer mechanical protection layer, which is not illustrated on the drawings.

It is to be understood that the current being conducted through the elements in the layer 23 and 33, respectively, can be used for heating the oil/gas being transported through the inner pipe 21 and 31, respectively, and will thus contribute to giving the oil/gas a favorable floating capacity and prevent condensation and sedimentation. In this connection the inner layer 22, 32 and outer insulation layer 24, 34 might be configured and composed in such a manner that the heat emission from current conducting elements 26-28, 36-37 is directed substantially inwardly towards the medium to be transported in the inner pipe 21, respectively 31. In other words the insulation 22 and 24 of conduit 20, and the insulation 32 and 34 of conduit 30 should be adapted to the heat emission from the current conducting elements 23 and 33, respectively.

It should further be noted that the remaining elements 25 in the conduit 20 illustrated in FIG. 3, and the remaining elements 35 in the conduit 30 illustrated in FIG. 4, might constitute reinforcing elements contributing to the overall strength of the combined transportation conduit described above. Possibly, some or all of these remaining elements could constitute conductors for hydraulic and/or electrical signals.

Since the heating by magnetic induction in the steel pipeline is achieved by running high voltage electrical cables along the steel pipe severe consideration should be made when designing this pipeline transportation system, especially since the induced power will very much depend on the electrical and magnetic properties of the steel pipe.

By adding a thin layer from 0.1 to 0.5 millimeters of low resistivity material like aluminum, the induced power heating is increased considerably Likewise, the induced power is increased when the electric high voltage cables are run closer to the pipeline surface.

Further, the induced power heating and cable impedance will be approximately proportional to the power supply frequency. Both single phase and 3-phase power supply is considered, and the selection thereof is dependent on the sea bed configuration and the overall configuration of the deep sea oil fields. A three phase system will however give a balanced loading of the supply system, but any appropriate phase numbers could be contemplated Preferably, each pipe should be prefabricated on shore with two or more longitudinal slots in the layer 23 and 33, respectively, which layer may also constitute a weight coating as well as an insulating or corrosion resistant layer.

Also the electric cables should be prefabricated in proper lengths for transportation to the barge. In connection with a case study a proper prefabricated length is 24 km at a voltage level of 24 kV.

On the laying barge the pipeline will be produced in a conventional manner. One special case is when making up for mating the double joints on the barge. The slots will then be aligned within a few degrees of rotational difference.

The double joint will also have to be rotationally aligned before welding it on to the pipeline ensuring that the cable slots will be continuous along the pipeline The electric cables will be attached to the insulating layer of the pipeline after the last repair and x-ray inspection station, and the cables will be taken to the barge in special baskets for transportation from the manufacturing plant.

If a pipelength of 70 km is contemplated there will be a need for 3×3 baskets of cable, and 2×3 cable joints have to be performed on the lay barge.

At the barge the conductor baskets will be located on rotating turn tables, and the cable will run via guiding devices into the slots in the pipeline protecting layer. A polymer based glue composite will then be applied in the cable slots to lock the cables in correct position Cable attachment will usually not slow down the pipeline process itself.

If the cable is damaged during operation, a method for rapid and reliable fault location is necessary. For the above described type of cable a measuring bridge or possible a pulse echometer method could be applied from the end of the cable for possible prelocation of fault.

For exact fault location it is recommended that so-called inductive search coil method is used, as operated with a remote operating vehicle from a vessel.

One option for repair is the use of a hyperbaric welding chamber, and this system is available with all facilities.

A case study has been accomplished to compare different methods of controlling hydrate in pipelines, and in connection with a pipeline having a nominal diameter of 36", wall thickness of 38 mm, HC production of 32 MSCMD, hydrate formation temperature of 15° C. and a length range of 0-70 km, it has been proven that the electric heating concept is economically better than chemical injection in the length range of 0-40 km, whereas in the length range from 40 to 70 km the chemical injection is preferred, from an economical point of view.

We claim:

1. Apparatus for transmitting a fluid selected from gas, oil or a mixture of gas and oil and electrical energy between spaced apart locations comprising:
   a) at least one single chamber pipe means made of a strong, electrically conductive steel material for transmitting said fluid therethrough, said pipe means being provided with at least one outer layer of a corrosion resisting material; and
   b) a plurality of high voltage alternating current transmitting elements arranged along, and non-electrically connected to said pipe means and adapted to transmit alternating current at a voltage level of at least 12 kilovolts passing through said elements from a source of alternating current to a location spaced apart from said source of alternating current, said elements being in close proximity to an outer surface of the pipe means so as to enable heat arising from a loss of electrical energy in said elements to be transferred from said high voltage alternating current transmitting elements to the fluid in said pipe means.

2. The apparatus of claim 1 wherein the source of alternating current is located on land and the spaced apart location is located offshore.

3. The apparatus of claim 1 wherein the source of alternating current is located offshore and the spaced apart location is located on land.

4. The apparatus of claim 1 further comprising a layer of thermally insulating material surrounding said plurality of high voltage alternating current transmitting elements.

5. The apparatus of claim 1 wherein said alternating current transmitting elements are made of copper.

6. The apparatus of claim 1 wherein said alternating current transmitting elements are for transmitting a 3-phase alternating current.

7. The apparatus of claim 1 wherein said alternating current transmitting elements are for transmitting a single-phase alternating current.

8. The apparatus of claim 1 wherein the single chamber pipe means is made of carbon steel.

9. Apparatus for transmitting a fluid selected from gas, oil or a mixture of gas and oil and electric energy between spaced apart locations comprising:
   a) at least one pipe made of a strong, electrically conductive material for transmitting said fluid, said pipe being provided with at least one outer layer of a corrosion resisting material;
   b) a plurality of high voltage electrical energy transmitting elements arranged along said pipe and adapted to transmit and electrical energy at a voltage level of at least 12 kilovolts between said spaced apart locations said elements being in close proximity to an outer surface of the pipe so as to enable heat arising from a loss of electrical energy in said elements to be transferred from said elements to the fluid in said pipe; and
   c) regulating means operatively connected to said spaced apart locations for regulating electrical energy from a source passing through said elements and thereby regulating the heat passing to the fluid in the pipe.

10. The apparatus of claim 9 wherein said regulating means comprises at least one spare switchable current load adapted to provide a defined amount of electric energy to said elements and heat to said fluid in said pipe.

11. Apparatus for transmitting a fluid selected form gas, oil or a mixture of gas and oil and electric energy between spaced apart locations comprising:
   a) at least one pipe made of a strong, electrically conductive material for transmitting said fluid, said pipe being provided with at least one outer layer of a corrosion resisting material;
   b) a plurality of high voltage electrical energy transmitting elements arranged along said pipe and adapted to transmit said electrical energy at a voltage level of at least 12 kilovolts between spaced apart locations, said elements being in close proximity to an outer surface of the pipe so as to enable heat arising from a loss of electrical energy in said elements to be transferred from said elements to the fluid in said pipe; and
   c) means measuring operatively connected to said spaced apart locations for measuring electrical energy from a source passing through said elements and thereby measuring the heat passing to the fluid in the pipe.

12. The apparatus of claim 11 wherein said measuring means comprises at least one spare switchable current load adapted to provide a defined amount of electric energy to said elements and heat to said fluid in said pipe.

* * * * *